(12) United States Patent
Kumano (10) Patent No.: US 7,164,832 B2
(45) Date of Patent: Jan. 16, 2007

(54) OPTICAL FIBER AND OPTICAL COMMUNICATION SYSTEM EMPLOYING THE OPTICAL FIBER

(75) Inventor: Naomi Kumano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/279,319

(22) Filed: Apr. 11, 2006

(65) Prior Publication Data

US 2006/0233503 A1  Oct. 19, 2006

(30) Foreign Application Priority Data

Apr. 13, 2005  (JP) .............................. 2005-115374

(51) Int. Cl.
*G02B 6/02* (2006.01)

(52) U.S. Cl. ...................... 385/126; 385/123; 385/124; 385/127

(58) Field of Classification Search ......... 385/123–129
See application file for complete search history.

(56) References Cited

U.S. PATENT DOCUMENTS

| 6,856,744 | B1 | 2/2005 | Kumano | |
| 6,879,762 | B1* | 4/2005 | Mukasa | ....................... 385/123 |
| 7,046,889 | B1* | 5/2006 | Takahashi | ................... 385/127 |

FOREIGN PATENT DOCUMENTS

| JP | 2004-38133 | 2/2004 |
| JP | 2004-54151 | 2/2004 |

* cited by examiner

*Primary Examiner*—Brian Healy
*Assistant Examiner*—Charlie Peng
(74) *Attorney, Agent, or Firm*—Oblon, Spivak, McClelland, Maier & Neustadt, P.C.

(57) ABSTRACT

An optical fiber includes a core and a cladding surrounding the core. An absolute value of dispersion at a wavelength of 1550 nanometers is equal to or more than 4 ps/nm/km and equal to or less than 10 ps/nm/km. An absolute value of dispersion slope at the wavelength of 1550 nanometers is equal to or less than 0.04 ps/nm²/km. An effective area at the wavelength of 1550 nanometers is equal to or more than 40 μm². A transmission loss at the wavelength of 1500 nanometers is equal to or less than 0.205 dB/km.

8 Claims, 7 Drawing Sheets

| UNIT | Δ1 % | α1 | Δ2 % | Δ3 % | α3 | a μm | b/a | c/a | DISPERSION ps/nm/km | SLOPE ps/nm²/km | Aeff μm² | CUTOFF WAVELENGTH nm | BENDING LOSS dB/m |
|---|---|---|---|---|---|---|---|---|---|---|---|---|---|
| A1 | 0.28 | 6 | -0.30 | 0.30 | 1.5 | 10.5 | 1.7 | 2.8 | 5.8 | 0.027 | 109 | >1800 | >20 |
| A2 | 0.50 | 6 | -0.30 | 0.30 | 1.5 | 7.7 | 1.7 | 2.8 | 5.7 | 0.024 | 49 | <1550 | <10 |
| A3 | 0.60 | 6 | -0.30 | 0.30 | 1.5 | 7.0 | 1.7 | 2.8 | 5.8 | 0.027 | 40 | <1550 | <5 |
| B1 | 0.50 | 6 | -0.30 | 0.30 | 1.5 | 7.7 | 1.7 | 2.7 | 5.7 | 0.024 | 49 | <1550 | <10 |
| B2 | 0.50 | 1.5 | -0.30 | 0.30 | 1.5 | 9.6 | 1.7 | 2.8 | 5.6 | 0.004 | 61 | >1800 | >20 |
| C1 | 0.50 | 6 | 0.10 | 0.30 | 1.5 | 5.3 | 1.7 | 2.8 | 13.8 | 0.075 | 91 | <1550 | <10 |
| C2 | 0.50 | 6 | 0.00 | 0.30 | 1.5 | 6.4 | 1.7 | 2.8 | 8.3 | 0.082 | 81 | <1550 | <10 |
| C3 | 0.50 | 6 | -0.30 | 0.30 | 1.5 | 7.7 | 1.7 | 2.8 | 5.7 | 0.024 | 49 | <1550 | <10 |
| C4 | 0.50 | 6 | -0.80 | 0.30 | 1.5 | 8.4 | 1.7 | 2.8 | 18.6 | 0.036 | 41 | <1550 | <5 |
| D1 | 0.50 | 6 | -0.30 | 0.50 | 1.5 | 8.6 | 1.7 | 2.8 | 5.8 | 0.023 | 59 | >1800 | >20 |
| D2 | 0.50 | 6 | -0.30 | 0.30 | 1.5 | 7.7 | 1.7 | 2.8 | 5.7 | 0.024 | 49 | <1550 | <10 |
| D3 | 0.50 | 6 | -0.30 | 0.00 | 1.5 | 6.8 | 1.7 | 2.8 | 5.8 | 0.022 | 43 | <1550 | >20 |
| D4 | 0.50 | 6 | -0.30 | -0.10 | 1.5 | 6.6 | 1.7 | 2.8 | 5.4 | 0.018 | 41 | <1550 | >20 |
| E1 | 0.50 | 6 | -0.30 | 0.30 | 1.5 | 7.7 | 1.7 | 2.7 | 5.7 | 0.024 | 49 | <1550 | <10 |
| E2 | 0.50 | 6 | -0.30 | 0.30 | 8 | 8.2 | 1.7 | 2.8 | 5.8 | 0.015 | 54 | >1800 | <5 |

| | UNIT | Δ1 % | α1 | Δ2 % | Δ3 % | Δ4 % | α3 | a μm | b μm | c μm | d μm | DISPERSION ps/nm/km | SLOPE ps/nm²/km | Aeff μm² | LOSS dB/km | CUTOFF WAVELENGTH nm | PMD ps/(km)^(1/2) | BENDING LOSS dB/m |
|---|---|---|---|---|---|---|---|---|---|---|---|---|---|---|---|---|---|---|
| EXAMPLE 1 | | 0.51 | 8 | -0.30 | 0.30 | / | 1.5 | 7.6 | 13.1 | 20.8 | / | 4.93 | 0.027 | 45.9 | 0.194 | 1180.9 | 0.02 | 3.8 |
| EXAMPLE 2 | | 0.50 | 8 | -0.30 | 0.30 | / | 1.3 | 7.7 | 13.0 | 21.2 | / | 4.89 | 0.026 | 46.8 | 0.202 | 1239.1 | 0.06 | 5.8 |
| EXAMPLE 3 | | 0.50 | 6 | -0.30 | 0.30 | / | 1.5 | 7.6 | 13.1 | 21.2 | / | 7.42 | 0.029 | 45.1 | 0.201 | 1256.0 | 0.08 | 0.5 |
| EXAMPLE 4 | | 0.51 | 8 | -0.31 | 0.29 | 0.14 | 1.5 | 7.6 | 13.1 | 21.0 | / | 7.85 | 0.028 | 45.8 | 0.201 | 1167.0 | 0.03 | 2.6 |
| COMPARATIVE EXAMPLE 1 | | 0.48 | 8 | -0.31 | 0.30 | 0.22 | / | 7.7 | 13.5 | 16.9 | 20.1 | 4.14 | 0.025 | 45.4 | 0.212 | 1342.6 | 0.03 | 2.2 |
| COMPARATIVE EXAMPLE 2 | | 0.50 | 4 | -0.38 | 0.29 | / | / | 8.2 | 13.3 | 16.0 | 20.0 | 4.50 | 0.028 | 47.0 | 0.221 | 1301.2 | 0.09 | 4.5 |
| COMPARATIVE EXAMPLE 3 | | 0.50 | 8 | -0.32 | 0.30 | / | 10 | 7.6 | 13.3 | 16.6 | / | 7.57 | 0.027 | 39.8 | 0.207 | 1164.0 | 0.09 | 0.3 |

OPTICAL FIBER AND OPTICAL COMMUNICATION SYSTEM EMPLOYING THE OPTICAL FIBER

BACKGROUND OF THE INVENTION

1. Field of the Invention

The present invention relates to an optical fiber for wavelength-division-multiplexing (WDM) transmission and an optical communication system that employs the optical fiber.

2. Description of the Related Art

Recently, research and development for WDM transmission technologies are actively performed, and further expansion of a transmission band is required. In response to the request, development of non-zero dispersion shifted optical fiber (NZ-DSF) with a reduced dispersion slope is highly focused, aiming at expansion of the transmission band. A reduced dispersion slope NZ-DSF keeps an absolute value of dispersion appropriately and suppresses an absolute value of dispersion slope.

A reduced dispersion slope NZ-DSF is proposed in U.S. Pat. No. 6,856,744, in which an absolute value of dispersion at a wavelength of 1550 nm is equal to or more than 4 ps/nm/km and equal to or less than 10 ps/nm/km, an absolute value of dispersion slope is equal to or less than 0.04 ps/nm$^2$/km, and an effective area is 40 µm$^2$.

However, a refractive index profile of the reduced dispersion slope NZ-DSF disclosed in the above literature is based on an optical fiber with a core including four or five layers, which is more complex than a conventional NZ-DSF. Although desired dispersion, dispersion slope, and $A_{eff}$ may be obtained more easily by designing the core in four or five layers, it is difficult to reduce a transmission loss, and a production cost becomes high.

SUMMARY OF THE INVENTION

It is an object of the present invention to at least partially solve problems in the conventional technology.

An optical fiber according to one aspect of the present invention includes a core and a cladding surrounding the core. An absolute value of dispersion at the wavelength of 1550 nanometers is equal to or more than 4 ps/nm/km and equal to or less than 10 ps/nm/km. An absolute value of dispersion slope at the wavelength of 1550 nanometers is equal to or less than 0.04 ps/nm$^2$/km. An effective area at the wavelength of 1550 nanometers is equal to or more than 40 µm$^2$. A transmission loss at the wavelength of 1500 nanometers is equal to or less than 0.205 dB/km.

An optical transmission system according to another aspect of the present invention employs an optical fiber as an optical transmission line. An absolute value of dispersion of the optical fiber at the wavelength of 1550 nanometers is equal to or more than 4 ps/nm/km and equal to or less than 10 ps/nm/km. An absolute value of dispersion slope of the optical fiber at the wavelength of 1550 nanometers is equal to or less than 0.04 ps/nm$^2$/km. An effective core area of the optical fiber at the wavelength of 1550 nanometers is equal to or more than 40 µm$^2$. A transmission loss of the optical fiber at the wavelength of 1500 nanometers is equal to or less than 0.205 dB/km.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
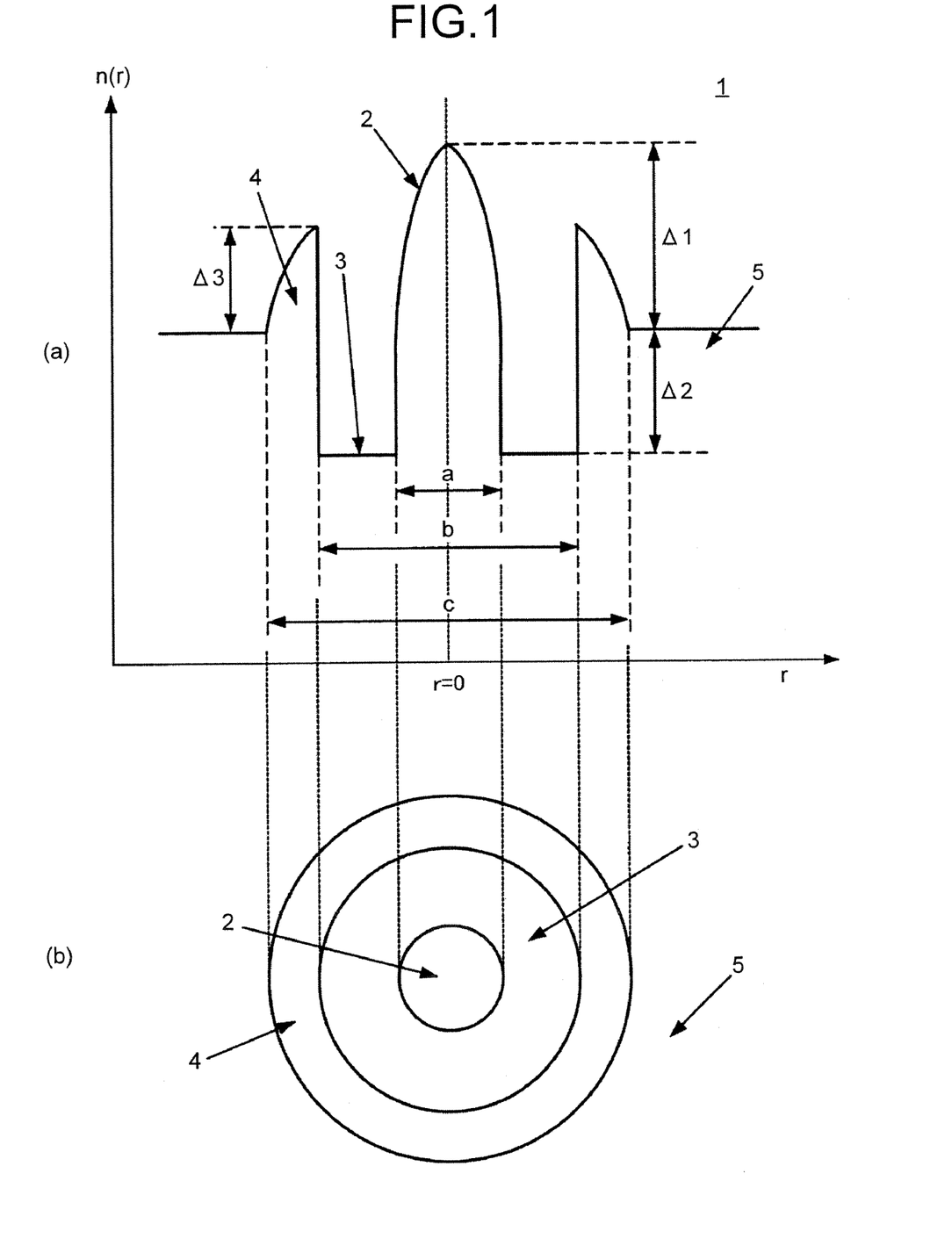
FIG. 1 is a schematic of an optical fiber according to an embodiment of the present invention.

Exemplary embodiments of the present invention are explained below in detail with reference to the accompanying drawings. FIG. 1 is a schematic of an optical fiber 1 according to an embodiment of the present invention. A part (a) of FIG. 1 is a refractive index profile, and a part (b) of FIG. 1 is a cross sectional view. The optical fiber 1 is formed with a core structure in three layers including a first core 2, a second core 3 surrounding the first core, a third core 4 surrounding the second core, and a cladding 5 surrounding the third core.

A refractive index of the second core 3 is lower than that of the first core 2. A refractive index of the third core 4 is lower than that of the first core 2 and higher than that of the second core 3. A refractive index of the cladding 5 is higher than that of the second core 3 and lower than that of the third core 4. The optical fiber 1 according to the present embodiment has a so-called W-segment type refractive index profile with a relation $\Delta 1 > \Delta 3 > 0 > \Delta 2$, where $\Delta 1$ is a relative refractive index difference of the first core 2 to the cladding 5, $\Delta 2$ is a relative refractive index difference of the second core 3 to the cladding 5, and $\Delta 3$ is a relative refractive index difference of the third core 4 to the cladding 5.

A refractive index profile of the first core 2 is an a-profile, and a of the first core 2 is represented by a1. A refractive index profile of the third core 4 from a point having a highest refractive index to the cladding 5 is also an a-profile, and a of the third core 4 is represented by a3. When the highest refractive index is observed not only at a point but also over a specific region, a3 of the third core 4 is indicated by a between the innermost point of the region and the cladding.

The relative refractive index differences $\Delta 1$, $\Delta 2$, and $\Delta 3$ are defined by $$\Delta 1 = \{(n_1 - n_c)/n_c\} \times 100 [\%] \qquad (1)$$

$$\Delta 2 = \{(n_2 - n_c)/n_c\} \times 100 [\%] \qquad (2)$$

$$\Delta 3 = \{(n_3 - n_c)/n_c\} \times 100 [\%] \qquad (3)$$

where $n_1$ is the maximum refractive index of the first core 2, $n_2$ is the minimum refractive index of the second core 3, $n_3$ is the maximum refractive index of the third core 4, and $n_c$ is the refractive index of the cladding, respectively.

A diameter of the first core is denoted by a, a diameter of the second core is denoted by b, and a diameter of the third core is denoted by c.

The first core diameter a is measured at a point with the same refractive index as that of the cladding 5 on the boundary between the first core 2 and the second core 3. The second core diameter b is measured at a point with a relative refractive index difference of a half of Δ2 on the boundary between the second core 3 and the third core 4. The third core diameter c is measured at a point with a relative refractive index difference of a tenth of Δ3 on the boundary between the third core 4 and the cladding 5.

a1 and a3 of the a-profiles are defined by $$n^2(r) = n_1^2 \{1 - 2(\Delta 1/100) \times (2r/a)^{a1}\} \quad (4)$$

where $0 < r < a/2$, and $$n^2(r) = n_3^2 \{1 - 2(\Delta 3/100) \times \{(r - c_{max})/(c/2 - C_{max})\}^{a3}\} \quad (5)$$

where $c_{max}/2 < r < c/2$, respectively.

A distance along the radial direction from the core center of an optical fiber is denoted by r, and a refractive index at position r is denoted by n(r). a distance along the radial direction from the core center of an optical fiber to a point with the highest refractive index in the third core is denoted by $c_{max}/2$, and when the highest refractive index is observed not only at a point but also over a specific region, the distance is measured to the innermost of the region.

Figure 2:
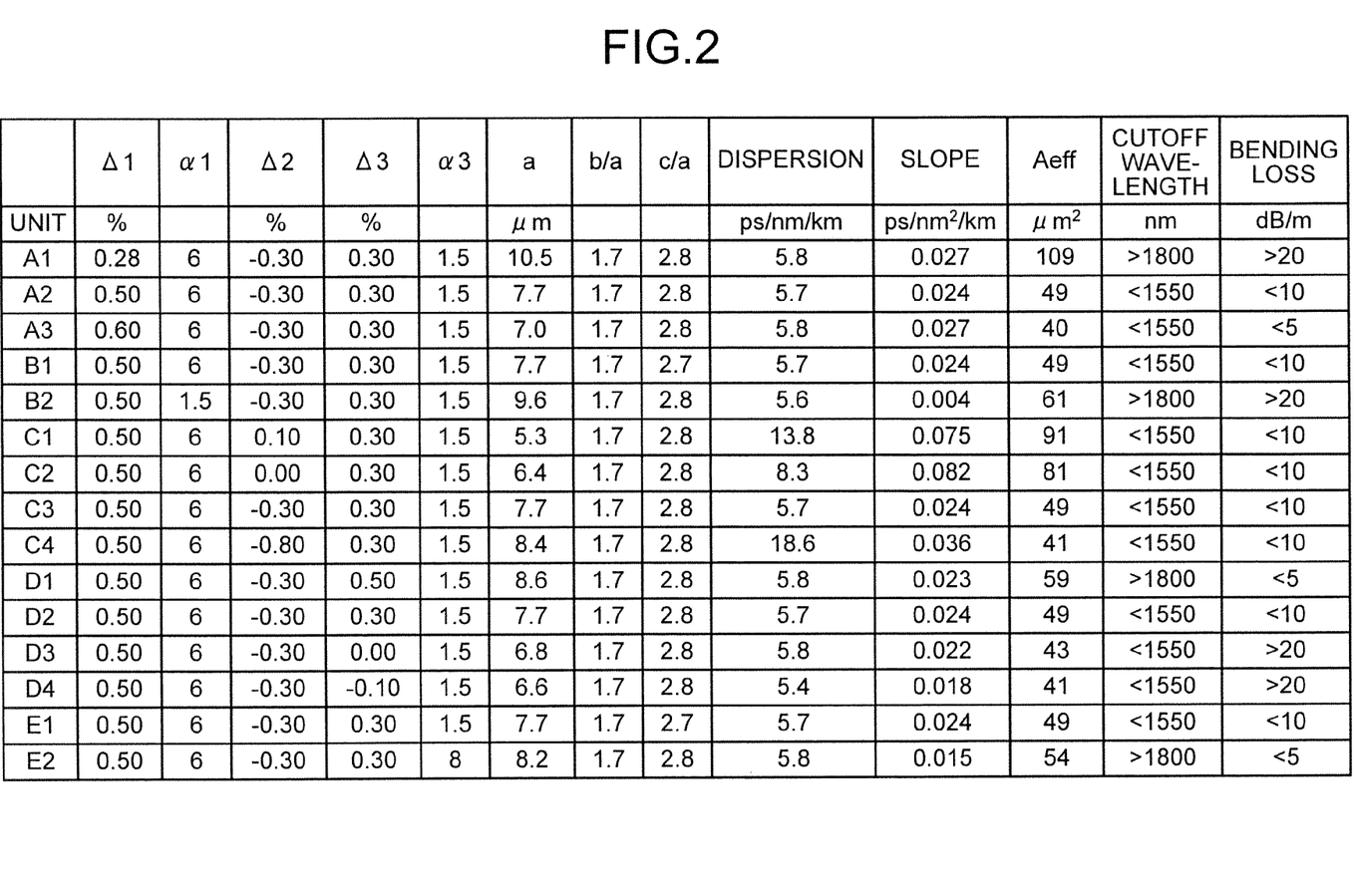
FIG. 2 is a table of calculated characteristics of optical fibers by a simulation.

Based on the W-segment type refractive index profile shown in FIG. 1, a simulation was carried out with parameters, Δ1, Δ2, Δ3, a, b, and c to find optimal solution(s). The optimal profile according to an example 1 is defined to have solution(s) satisfying the following conditions:

an absolute value of dispersion at the wavelength of 1550 nm is equal to or more than 4 ps/nm/km and equal to or less than 10 ps/nm/km;

an absolute value of dispersion slope at the wavelength of 1550 nm is equal to or less than 0.04 ps/nm²/km; and an effective area $A_{eff}$ at the wavelength of 1550 nm is equal to or more than 40 μm². Results are shown in FIG. 2. In FIG. 2, "Dispersion" designates a value of dispersion at the wavelength of 1550 nm, "Slope" designates dispersion slope at the wavelength of 1550 nm, "$A_{eff}$" designates an effective area at the wavelength of 1550 nm, "Cutoff wavelength" designates a cable cutoff wavelength, and "Bending loss" designates a bending loss at the wavelength of 1550 nm with a bending diameter of 20 millimeters with 16 turns.

The cable cutoff wavelength refers to a cable cutoff wavelength $\lambda_{cc}$ defined in ITU-I G.650.1. Other terms not particularly defined in the present specification are to be in conformity with the definitions and the measuring methods according to ITU-I G.650.1.

In FIG. 2, optical fibers that satisfy the characteristics described above are A2, A3, C3, D2, and E1.

Figure 3:
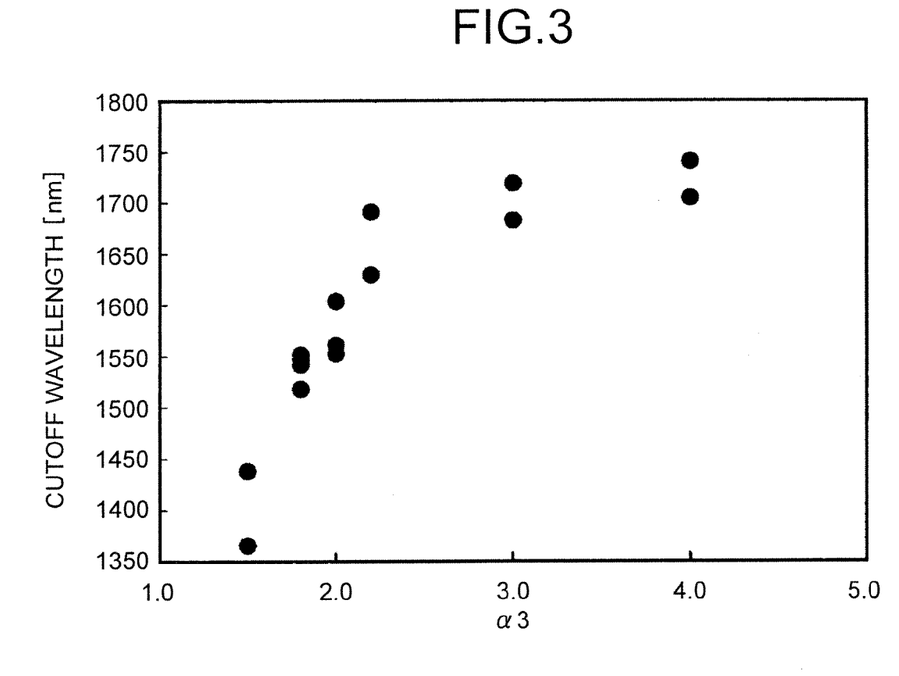
FIG. 3 is a graph of a relation between a3 and cutoff wavelength obtained by a simulation.

In FIG. 3, researched results about changes in the cutoff wavelength are shown, where the dispersion and the bending loss are held at a substantially constant level around 6 ps/nm/km and 10 dB/km respectively, while the value of a3 is varied. As shown in FIG. 3, when a3 reaches greater than 2.0, the cutoff wavelength increases sharply. Consequently, a3 is preferably equal to or less than 2.0.

As shown in FIGS. 2 and 3, with an optical fiber with the W-segment type refractive index profile, to satisfy the characteristics described above, preferred conditions are as follows:

the relative refractive index difference Δ1 of the first core 2 to the cladding 5 is between 0.3% and 0.6%;

a1 of the first core 2 is equal to or more than 2.0;

the first core diameter a is between 7 μm and 10 μm;

the relative refractive index difference Δ2 of the second core 3 to the cladding 5 is between −0.5% and −0.1%;

the ratio b/a of the second core diameter b to the first core diameter a is between 1.5 and 2.0;

the relative refractive index difference Δ3 of the third core 4 to the cladding 5 is between 0.1% and 0.4%;

the ratio c/a of the third core diameter c to the first core diameter a is between 2.2 and 3.0; and a3 of the third core is equal to or less than 2.0.

Figure 4:
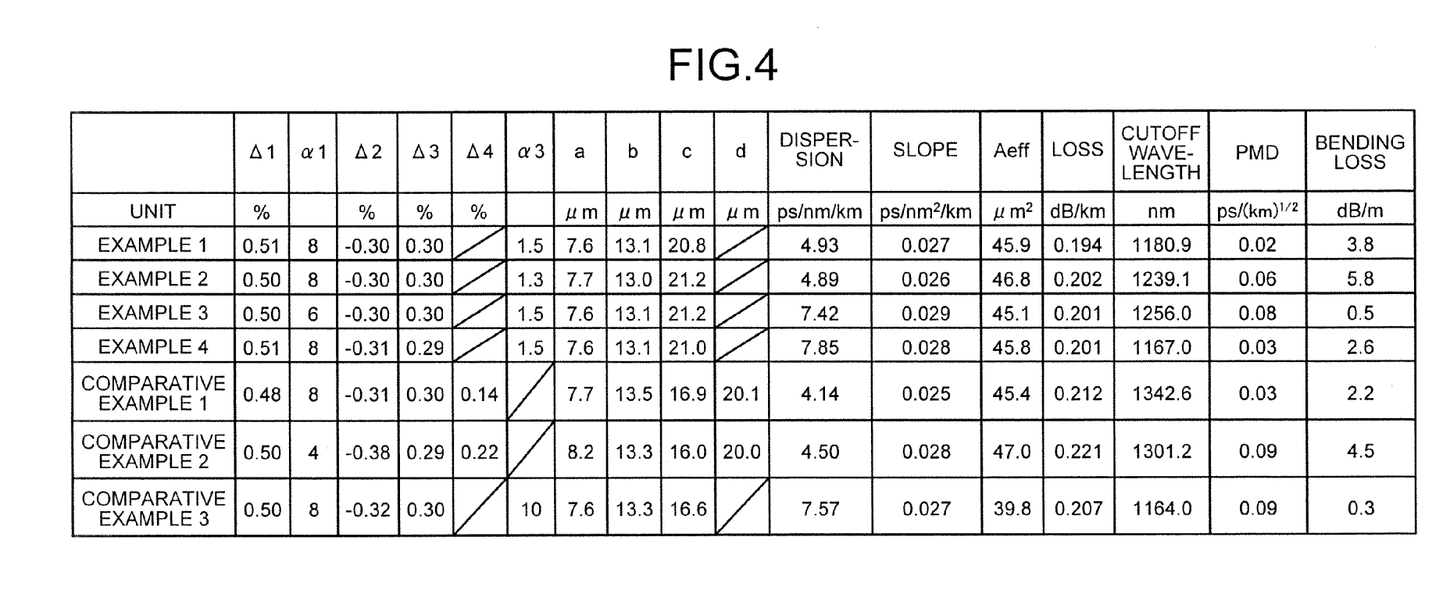
FIG. 4 is a table of characteristics of experimentally manufactured optical fibers.
Figure 5:
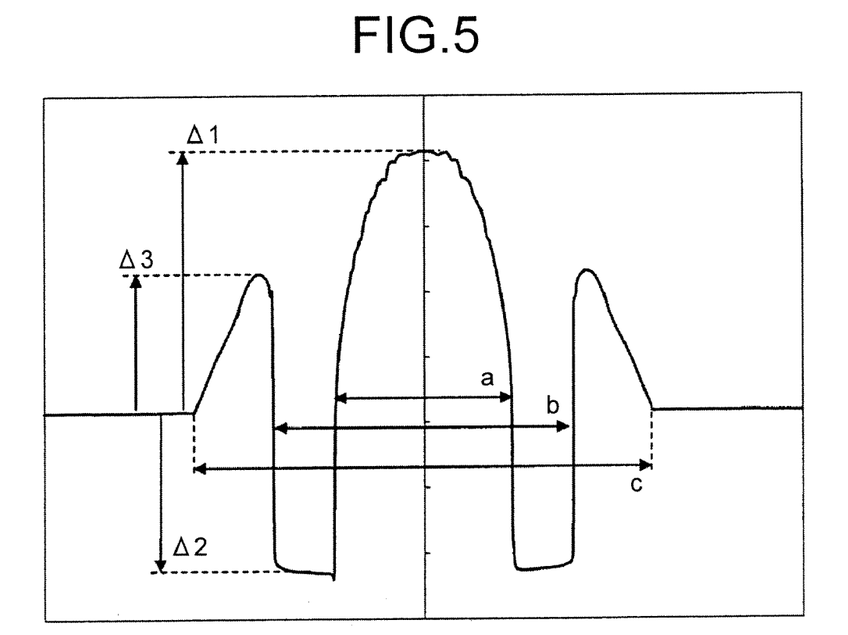
FIG. 5 is a schematic of a refractive index profile of optical fibers according to examples 1 to 4 of the embodiment.
Figure 6:
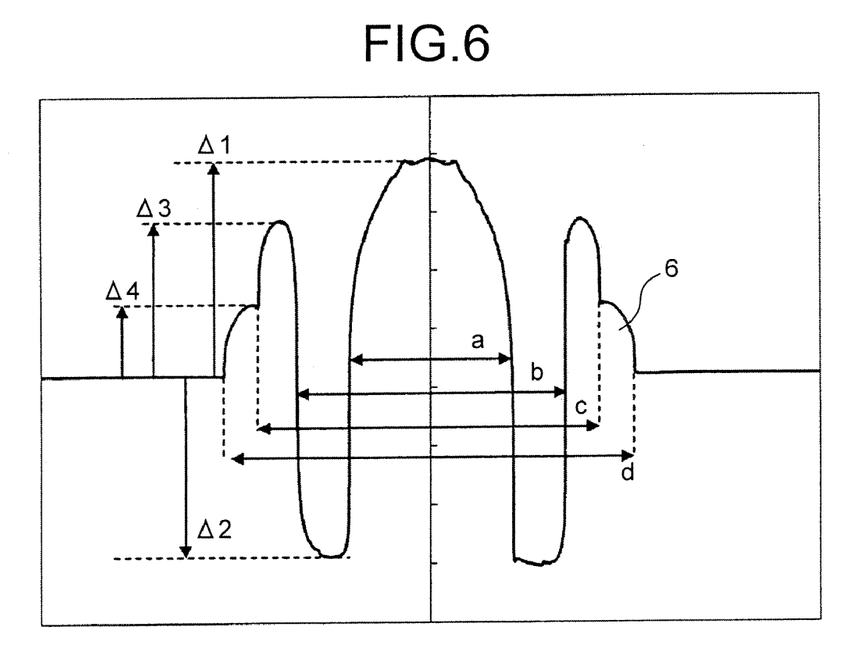
FIG. 6 is a schematic of a refractive index profile according to comparative examples 1 and 2.
Figure 7:
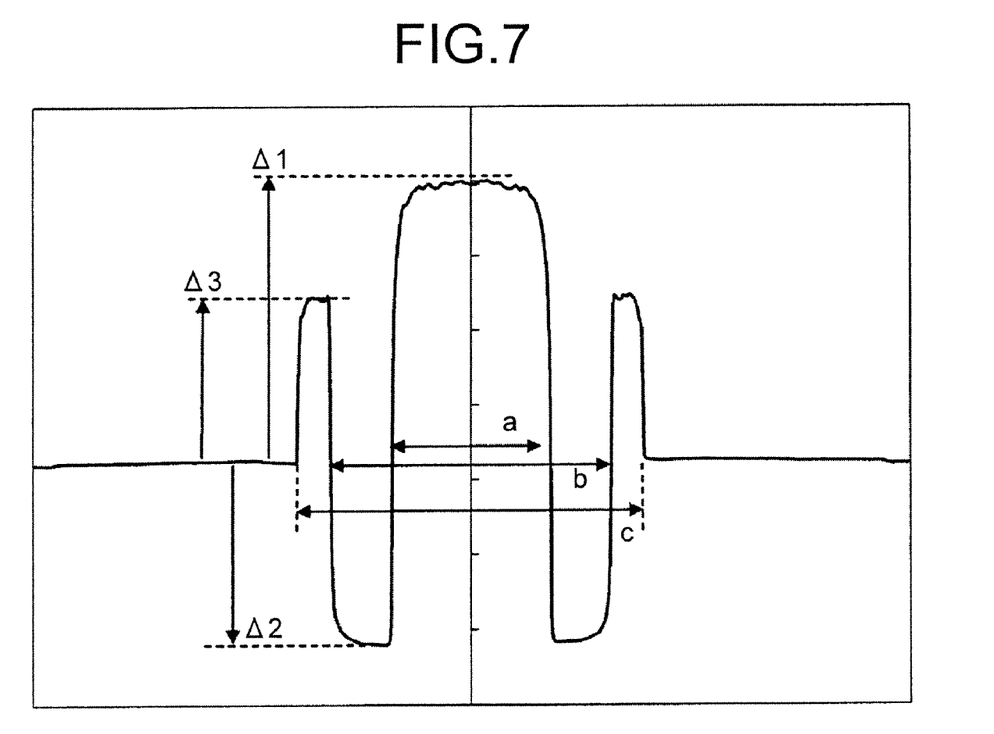
FIG. 7 is a schematic of a refractive index profile according to a comparative example 3.

Based on the results obtained from the simulation described above, actual optical fibers were manufactured experimentally. Results are shown in FIG. 4. Based on examples and comparative examples in FIG. 4, refractive index profiles of optical fibers according to examples 1 to 4, comparative examples 1 and 2, and comparative example 3 are shown in FIGS. 5, 6, and 7 respectively. In the comparative examples 1 and 2, the core is structured in four layers, in which a fourth core 6 is disposed externally to the periphery of the third core 4.

The same descriptions in FIG. 4 as those in FIG. 2 designate the same terms. In addition, Δ4 denotes a relative refractive index difference of the fourth core to the cladding 5, d denotes a diameter of the fourth core 6, "Loss" designates a transmission loss at the wavelength of 1550 nm, and "PMD" designates polarization mode dispersion at the wavelength of 1550 nm.

From the examples, obtained results were substantially similar to the calculated results by the simulation. According to any one of the examples 1 to 4 and the comparative examples 1 and 2, the following conditions are also satisfied:

an absolute value of dispersion at the wavelength of 1550 nm is equal to or more than 4 ps/nm/km and equal to or less than 10 ps/nm/km;

an absolute value of dispersion slope at the wavelength of 1550 nm is equal to or less than 0.04 ps/nm²/km; and an effective area $A_{eff}$ at the wavelength of 1550 nm is 40 μm² or more. The PMD and the bending loss are also at the substantially same value.

However, looking at the transmission losses, according to the comparative examples 1 and 2, the values are both 0.210 dB/km or more, while any of the values equal to or less than 0.205 dB/km according to the examples 1 to 4.

In the comparative example 3, the core is structured in three layers as shown in FIG. 7, having the W-segment type refractive index profile, but the third core has a step index profile without inclination (a3=10). According to the comparative example 3, the following conditions are also satisfied:

an absolute value of dispersion at the wavelength of 1550 nm is equal to or more than 4 ps/nm/km and equal to or less than 10 ps/nm/km;

an absolute value of dispersion slope at the wavelength of 1550 nm is equal to or less than 0.04 ps/nm²/km; and the PMD and the bending loss are also at the substantially same value.

However, the transmission loss is at 0.207 dB, which is slightly larger, and also $A_{eff}$ does not satisfy the critical value of 40 μm² or more. Consequently, it is found that, when the refractive index profile of the third core does not include an inclination as shown in the comparative example 3, it is difficult to reduce the transmission loss and to expand $A_{eff}$ to 40 μm² or more.

In conclusion, it is verified that, when the refractive index profile is a W-segment type based on a three-layerd core structure, and refractive index profile of the third core has an inclination (namely, a3 is equal to or less than 2.0), an optical fiber can be obtained with the following characteristics:

an absolute value of dispersion at the wavelength of 1550 nm is equal to or more than 4 ps/nm/km and equal to or less than 10 ps/nm/km;

an absolute value of dispersion slope at the wavelength of 1550 nm is equal to or less than 0.04 ps/nm²/km;

an effective core area $A_{eff}$ at the wavelength of 1550 nm is equal to or more than 40 μm²; and a transmission loss at the wavelength of 1500 nm is equal to or less than 0.205 dB/km.

The inclination of the third core in refractive index profile of the optical fiber according to the present embodiment can be achieved by gradually reducing a content of germanium (Ge), which is a dopant to increase a refractive index, towards the periphery, when forming the third core.

A reason for a small transmission loss of the optical fiber according to the present embodiment is considered that locations with a significant change in the amount of Ge are reduced, locations with a significant change in the viscosity of glass are reduced in radial direction of the optical fiber, and a residual stress caused by rapid cooling during fiber drawing can be reduced.

Thus, simplification of the refractive index profile allows easier manufacturing and contributes to cost reduction.

Figure 8:
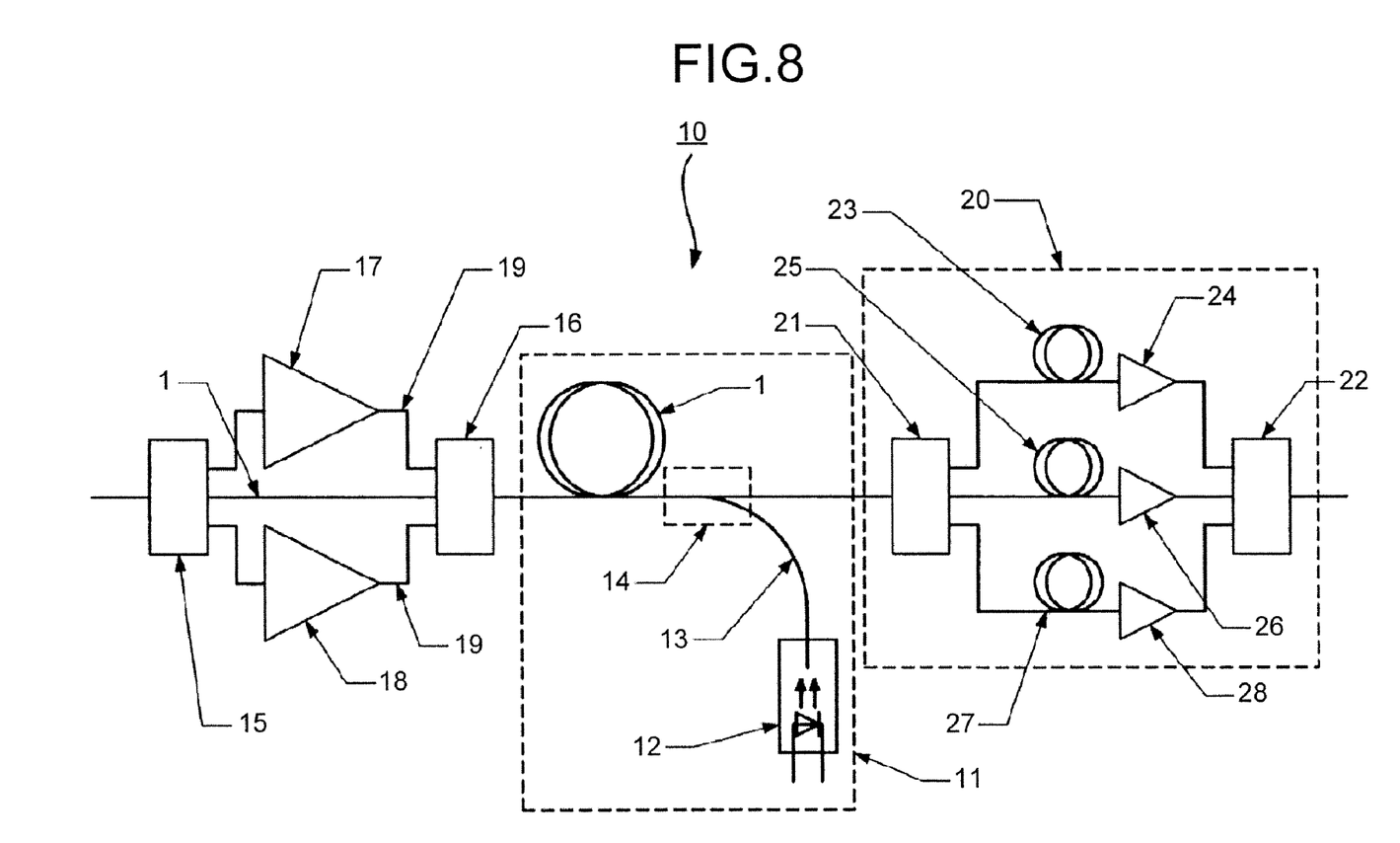
FIG. 8 is a schematic of an optical communication system according to another embodiment of the present invention.

FIG. 8 is a schematic of an optical communication system 10 according to another embodiment of the present invention. The optical transmission system 10 employs the optical fiber 1 of the above embodiment as an optical transmission line, and includes a distributed Raman amplifier 11, discrete optical amplifiers 17 and 18 that amplify signal light(s) in at least one of an S-band, a C-band, and an L-band, and a dispersion-compensating unit 20.

For the optical fiber 1 as an optical transmission line, a demultiplexer 15 and a multiplexer 16 are arranged with a space between them on the upstream side from the distributed Raman amplifier 11, and the dispersion-compensating unit 20 is arranged on the downstream side from the Raman amplifier 11.

The distributed Raman amplifier 11 includes a pumping light source 12 that excites a signal light in the S-band, and a multiplexer 14 provided to the optical fiber 1. The pumping light source 12 is connected to the multiplexer 14 via an optical fiber 13, to be used for backward pumping of a signal light related to the S-band.

The discrete optical amplifiers 17 and 18 are Erbium-doped optical fiber amplifiers (EDFAs) with an optical fiber 19, connected to the demultiplexer 15 and the multiplexer 16, and amplify signal light(s) in the C-band and the L-band respectively.

The dispersion-compensating unit 20 includes a demultiplexer 21, a multiplexer 22, and dispersion-compensating optical fibers 23, 25, and 27 arranged between the demultiplexer 21, and the multiplexer 22. The dispersion-compensating optical fibers 23, 25, and 27 are prepared for the S-band, the C-band, and the L-band respectively, and provided with optical amplifiers 24, 26 and 28 respectively, which compensate a loss of the signal light in each band.

The optical transmission system 10 uses the distributed Raman amplifier 11 with the optical fiber 1 as an optical transmission line. Therefore, the optical transmission system 10 can suppress the maximum power input to the optical fiber 1 at a low level, thereby ensuring to prevent a signal distortion caused by a nonlinear phenomenon occurring in the optical fiber 1.

As the Raman amplifier, a discrete type is also available as well as the distributed type as described above. When a discrete Raman amplifier is used for WDM transmission, an influence of the nonlinear phenomenon occurring in the optical fiber cannot be ignored. However, since the optical transmission system 10 according to the present embodiment uses the optical fiber 1 of the above embodiment with an effective area $A_{eff}$ of 40 μm² or more at the wavelength of 1550 nm, the signal distortion caused by the nonlinear phenomenon can be avoided, even when the discrete Raman amplifier is applied while using the optical fiber according to the present embodiment as an optical transmission line.

Thus, the optical fiber 1 can be applied as an optical transmission line for both of a system using the distributed Raman amplifier and a system using the discrete Raman amplifier.

In addition, use of the optical fiber 1 according to the present embodiment can suppress accumulated dispersion at a low level. As a result, when using the optical fiber 1 at a transmission speed of, for example, 20 Gbit/s, the optical fiber does not need the dispersion-compensating unit 20 shown in FIG. 5. Furthermore, in a case of a high speed transmission more than 40 Gbit/s, use of an optical fiber according to the present embodiment can suppress dispersion differences. Therefore, an optical fiber designed for the conventional standard single mode is enough to be installed in the dispersion-compensating unit as dispersion-compensating optical fiber. As a result, it is not necessary to design a new dispersion-compensating optical fiber, and it is possible to build a low-loss system.

According to an embodiment of the present invention, an optical fiber with a small transmission loss, which is suitably used for WDM transmission, can be provided at low cost.

Furthermore, according to another embodiment of the present invention, an optical transmission system for WDM transmission with a small transmission loss and a high performance can be constructed at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
a core; and
a cladding surrounding the core, wherein
an absolute value of dispersion at a wavelength of 1550 nanometers is equal to or more than 4 ps/nm/km and equal to or less than 10 ps/nm/km,
an absolute value of dispersion slope at the wavelength of 1550 nanometers is equal to or less than 0.04 ps/nm²/km,
an effective area at the wavelength of 1550 nanometers is equal to or more than 40 μm², and
a transmission loss at the wavelength of 1500 nanometers is equal to or less than 0.205 dB/km.

2. The optical fiber according to claim 1, wherein
a bending loss at the wavelength of 1550 nanometers with a bending diameter of 20 millimeters is equal to or less than 15 dB/km.

3. The optical fiber according to claim 1, wherein a cable cutoff wavelength λcc is equal to or less than 1550 nanometers.

4. The optical fiber according to claim 1, wherein a polarization mode dispersion at the wavelength of 1550 nanometers is equal to or less than 0.1 ps/km$^{1/2}$.

5. The optical fiber according to claim 1, wherein the core includes
- a first core located at a center of the optical fiber in a longitudinal direction;
- a second core surrounding the first core; and
- a third core surrounding the second core, a refractive index of the second core is lower than that of the first core, a refractive index of the third core is lower than that of the first core and higher than that of the second core, a refractive index of the cladding is higher than that of the second core and lower than that of the third core, a relative refractive-index difference of the third core to the cladding is between 0.1% and 0.4%, a ratio of a third core diameter to a first core diameter is between 2.2 and 3.0, and a refractive-index profile in a range from a portion having a highest refractive index in the third core to the cladding is an a-profile and the a of the third core a3 is equal to or less than 2.0.

6. The optical fiber according to claim 5, wherein a relative refractive-index difference of the first core to the cladding is between 0.3% and 0.6%, a refractive index-profile of the first core is the a-profile and the a of the first core a1 is equal to or more than 2.0, and the first core diameter is between 7 micrometers and 10 micrometers.

7. The optical fiber according to claim 5, wherein a relative refractive-index difference of the second core to the cladding is between −0.5% and −0.1%, and a ratio of a second core diameter to the first core diameter is between 1.5 and 2.0.

8. An optical transmission system that employs an optical fiber as an optical transmission line, wherein an absolute value of dispersion of the optical fiber at a wavelength of 1550 nanometers is equal to or more than 4 ps/nm/km and equal to or less than 10 ps/nm/km, an absolute value of dispersion slope of the optical fiber at the wavelength of 1550 nanometers is equal to or less than 0.04 ps/nm$^2$/km, an effective area of the optical fiber at the wavelength of 1550 nanometers is equal to or more than 40 μm$^2$, and a transmission loss of the optical fiber at the wavelength of 1500 nanometers is equal to or less than 0.205 dB/km.

* * * * *